United States Patent Office 3,395,339
Patented July 30, 1968

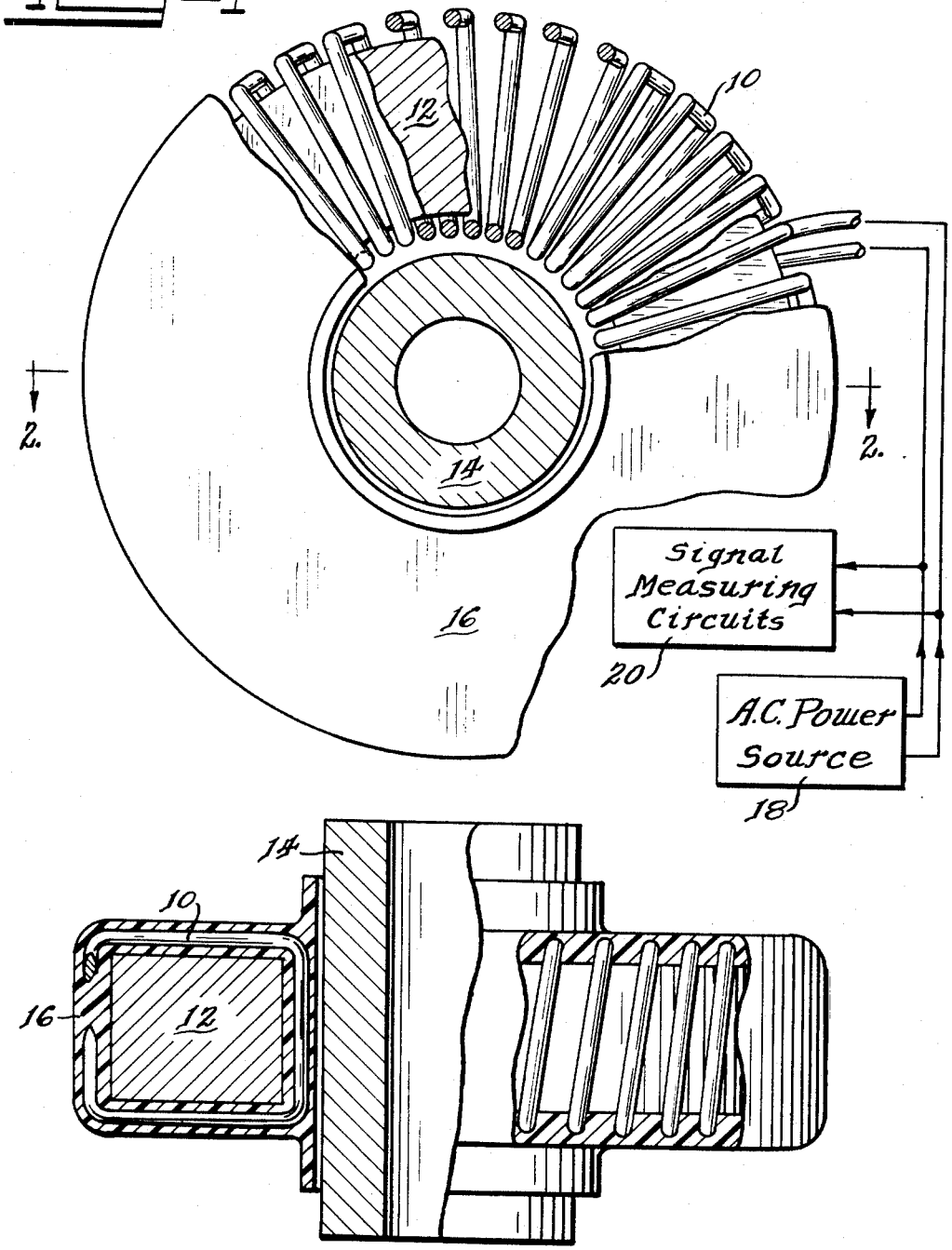

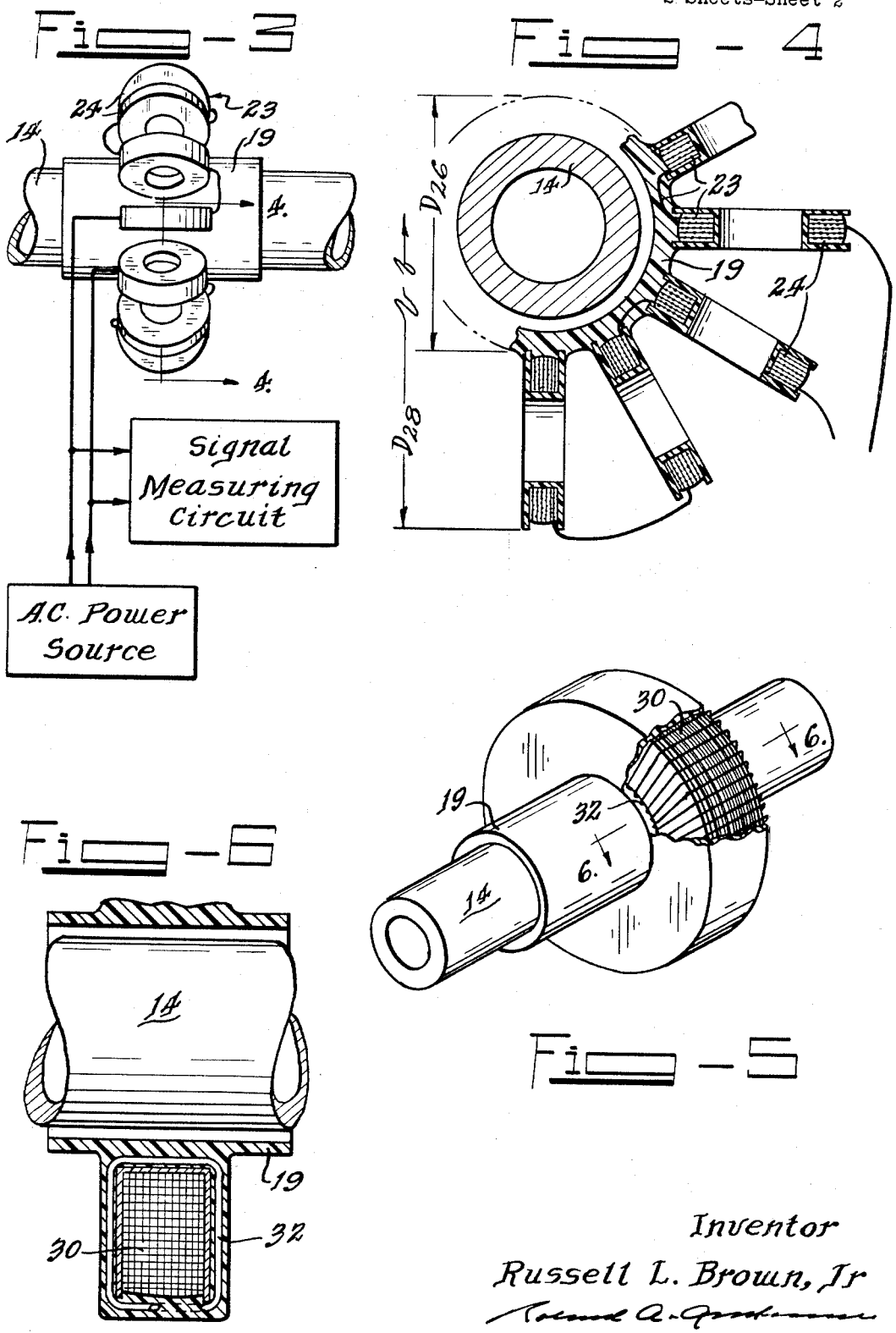

3,395,339
TOROIDAL EDDY CURRENT NONDESTRUCTIVE TESTING PROBE
Russell L. Brown, Jr., Richland, Wash., assignor to the United States of America as represented by the United States Atomic Energy Commission
Filed Jan. 21, 1966, Ser. No. 522,327
1 Claim. (Cl. 324—40)

ABSTRACT OF THE DISCLOSURE

A toroidal eddy current probe is provided for use with a conventional eddy current nondestructive testing device. The toroidal probe includes a plurality of encircling coils mounted to form a toroid whose annulus is sized to pass a sample therethrough. Each of the encircling coils is positioned such that the windings thereof are substantially parallel to the direction of motion of the sample through the annulus of the toroid formed by the encircling coils. Each of the encircling coils is serially connected.

The invention described herein was made in the course of, or under, a contract with the United States Atomic Energy Commission.

This invention relates to eddy current nondestructive testing devices wherein encircling coils are used.

Eddy current nondestructive testing devices are widely used to test extruded metal products, such as bars, rods or tubes, for discontinuities, such as cracks or inclusions. In this type of nondestructive testing, the eddy current devices generally employ one or more encircling coils wherein the object to be tested is passed through the annulus of the coils. The coils are usually narrow and wound close to each other on the same tubular form. With this type of device, the encircling coils are sensitive to sharp discontinuities, such as a crack, within the test object but are not sensitive to over-all changes in the characteristics of the test object, such as chemical purity or slow variations in diameter or concentricity. One major deficiency in the encircling coils presently used is that they are relatively insensitive to sharp discontinuities in the test object which extend circumferentially around the object. The coils are sensitive primarily to sharp discontinuities which extend longitudinally along the test object.

Accordingly, it is one object of the present invention to provide an improved eddy current nondestructive testing device which is capable of detecting sharp discontinuities which extend circumferentially around the test object.

It is another object of the present invention to provide an eddy current nondestructive testing device which is sensitive to sharp discontinuities extending around the circumference of a test object and relatively insensitive to sharp discontinuities extending longitudinally along the test object.

These and other objects of the present invention will become more apparent as the general description proceeds.

In general, the present invention comprises a torodially wound encircling coil having an external to internal diameter ratio which is materially in excess of one. Said coil, when excited, induces eddy currents along the longitudinal axis of a test object passed through the annulus thereof, whereby subsurface flaws extending around the circumference of said test object may be detected.

Further understanding of the present invention may best be obtained by consideration of the accompanying drawings wherein:

FIG. 1 is a sketch of an encircling coil constructed according to the present invention.

FIG. 2 is a sectional view of the coil of FIG. 1 taken along line 2—2.

FIG. 3 is a sketch of an alternate encircling coil construction for the practice of the present invention.

FIG. 4 is a sectional view of the coil of FIG. 3 taken along line 4—4.

FIG. 5 is a sketch of an alternate encircling coil construction for the practice of the present invention.

FIG. 6 is a sectional view of the coil of FIG. 5 taken along line 6—6.

Reference is made to FIGS. 1 and 2 wherein is shown an encircling coil 10 constructed according to the teachings of the present invention. The encircling coil 10 is toroidally wound about a nonmagnetic core 12 and sized such that a test object 14 may pass through the annulus thereof. The coil 10 is potted in a suitable coil-potting material 16. For the practice of the present invention, the ratio of the outer diameter to inner diameter of the encircling toroidal coil 10 must be materially in excess of one. A conventional A-C power source 18 is connected to the coil 10 to provide excitation therefor. The coil 10 is connected across conventional eddy current signal measuring circuits 20 of the type described by Robert C. McMasters in "Nondestructive Testing Handbook," vol. II, Ronald Press, 1959.

In operation, the excitation voltage from the A-C power source 18 is applied to the coil to generate therefrom a leakage flux. This leakage flux results from the ratio of the outer diameter to inner diameter of the coil 10 being materially in excess of one. The leakage flux from the excitation coil 10 induces eddy currents within the test object 14 which flow along the longitudinal axis thereof normal to any circumferential discontinuities within the test object 14 impairs the flow of eddy currents generated by the encircling coil 10, which impairment is detectable using conventional eddy current signal measuring circuits 20 connected to the encircling coil 10.

As stated supra, it is requisite for the practice of the present invention that the ratio of the outer diameter to inner diameter of the encircling toroidal coil 10 be materially in excess of one. For example, an encircling toroidal coil using 20-mil copper wire and toroidally wound in the manner shown in FIGS. 1 and 2 was used to detect circumferential flaws in ⅛-inch diameter aluminum rod. To detect such flaws, the encircling toroidal coil 10 was wound such that the inner diameter thereof was ¼ inch and the outer diameter was approximately two inches. As the ratio of the outer diameter to inner diameter increases materially beyond one, the leakage flux of the toroidal coil 10 increases to make the eddy current testing equipment more sensitive to the circumferential defects within the object under test.

Flux leakage from the encircling coil 10 may be further increased by using an encircling coil constructed in the manner shown in FIGS. 3 and 4. In FIGS. 3 and 4, the encircling coil 23 comprises a plurality of encircling coils 24 which are each wound in a normal circular manner. The encircling coils 24 are mounted on a tubular form 19 around the circumference thereof and are series-connected to effect the encircling coil 23 of the present invention. Each of the coils 24 is mounted on the tubular form 19 such that the windings thereof are substantially parallel to the direction of motion of the test object 14 through the annulus of the toroid formed by the coils 24. In the construction of the encircling coil 23 of FIG. 3, it is still requisite that the ratio of the outer diameter to inner diameter of the coil 23 be substantially greater than one. For the coil 23 of FIG. 3, the inner diameter is measured between the closest points of opposite coils 24 and is indicated in FIG. 4 as the distance $D_{26}$. The outer diameter is measured between the furthest points of opposite coils 24 and is indicated in FIG. 4 as distance $D_{28}$.

A further embodiment of the present invention is shown in FIGS. 5 and 6. In FIG. 5, a conventional encircling probe 30, wound in a normal circular manner, is used as a form for the encircling toroidal coil 32 of the present invention. The encircling toroidal coil 32 is wound about the conventional encircling coil 30 to form a coil which is capable of detecting circumferential and longitudinal discontinuities within the test object 14 simultaneously. With the combined coil construction of FIG. 5, conventional eddy current testing equipment, as previously referenced, may be used. It is to be noted that in the construction of FIG. 5 it is still necessary for the present invention that the ratio of the outer diameter to inner diameter of the encircling toroidal coil 32 be materially greater than one.

Persons skilled in the art will, of course, readily adapt the general teachings of the invention to embodiments far different than the embodiments illustrated. Accordingly, the scope of the protection afforded the invention should not be limited to the particular embodiment illustrated in the drawings and described above, but should be determined only in accordance with the appended claim.

The embodiments of the invention in which an exclusive property or privilege is claimed are defined as follows:

1. In an eddy current device for nondestructively testing a sample comprising an A-C power source and electrical signal-measuring means, the combination of said power source and said measuring means with a plurality of discrete encircling coils mounted spatially with respect to each other and forming a toroid whose annulus is sized to pass said sample therethrough, each of said encircling coils being mounted on individual non-magnetic cores with said cores being connected to a common cylindrical non-magnetic sleeve adapted to encircle said sample, each coil being positioned such that the windings thereof are substantially parallel to the direction of motion of said sample through the annulus of the toroid formed by said encircling coils, each of said encircling coils being sized such that the external to internal diameter ratio of the formed toroid is materially in excess of one, and means for serially connecting each of the windings of said encircling coils.

References Cited
FOREIGN PATENTS
890,070    2/1962    Great Britain.

RUDOLPH V. ROLINEC, *Primary Examiner.*

R. J. CORCORAN, *Assistant Examiner.*